United States Patent [19]

Allen et al.

[11] Patent Number: 5,313,515
[45] Date of Patent: May 17, 1994

[54] CALL COMPLETION SYSTEM WITH MESSAGE WRITING INDICATION UPON REGISTRATION OF MOBILE WITH BASESTATION

[75] Inventors: Michael Allen, Pirbright; John Garrett, Ipswich; Howard Green, London; Andrew Holland, Southend-on-Sea, all of England

[73] Assignee: Telecom Securicor Cellular Radio Limited, London, England

[21] Appl. No.: 571,863

[22] Filed: Aug. 24, 1990

[30] Foreign Application Priority Data

Aug. 25, 1989 [GB] United Kingdom ............... 8919323

[51] Int. Cl.⁵ ........................................... H04M 11/10
[52] U.S. Cl. ........................................ 379/59; 379/88; 379/89
[58] Field of Search ............... 379/59, 60, 63, 67, 379/88, 89, 201, 214, 58, 211

[56] References Cited

U.S. PATENT DOCUMENTS

| | | | |
|---|---|---|---|
| 4,413,158 | 11/1983 | Danford | 379/211 |
| 4,582,957 | 4/1986 | Hayes et al. | |
| 4,625,081 | 11/1986 | Lotito et al. | 379/88 |
| 4,747,126 | 5/1988 | Hood et al. | 379/88 |
| 4,794,638 | 12/1988 | Millett | 379/88 |
| 4,932,042 | 6/1990 | Baral et al. | 379/67 |
| 4,941,203 | 7/1990 | Patsiokas et al. | 379/67 |
| 4,964,156 | 10/1990 | Blair | 379/89 |
| 5,008,926 | 4/1991 | Misholi | 379/89 |
| 5,063,588 | 11/1991 | Patsiokas | 379/57 |
| 5,177,780 | 1/1993 | Kasper et al. | 379/59 |

FOREIGN PATENT DOCUMENTS 36619 9/1981 European Pat. Off.
0112967 7/1984 European Pat. Off.
0191541 11/1983 Japan ...................... 379/58

OTHER PUBLICATIONS

Ericsson Review, No. 3, 1987, pp. 130-140, Beddoes et al, "Cellular Radio Telephony—The Racal-Vodafone Network In Great Britain".
International Conference On Communications Jun. 10-14, 1979, vol. 1, Jun. 1979, pp. 321-325; Nacon et al "New Custom Calling Services".
IEEE International Conference On Communications Jun. 7-10, 1987, vol. 3. pp. 1385-1390, Yamamoto et al, "Communication Processing Technology for the Mobile Communication Network".

Primary Examiner—Curtis Kuntz
Assistant Examiner—Dwayne D. Bost
Attorney, Agent, or Firm—Nixon & Vanderhye

[57] ABSTRACT

A cellular telephone network comprising an exchange (101) and a voice messaging center (102) connected to the exchange, the exchange being connectable to a plurality of cellular telephones (103), each having an associated voice mailbox (VM1) at the voice messaging center (102), the exchange (101) being operable in the event of failure to connect a caller to a desired telephone (103) to divert the call to the voice messaging center (102) which can record a message from the caller in the associated mailbox (VM1). When such a message has been stored, the VMC transmits a "message waiting" flag for that telephone to the exchange (101). The exchange (101) transmits a "message waiting" signal to the telephone when it registers with a cell of the network, and/or if it initiates an outgoing call.

32 Claims, 3 Drawing Sheets

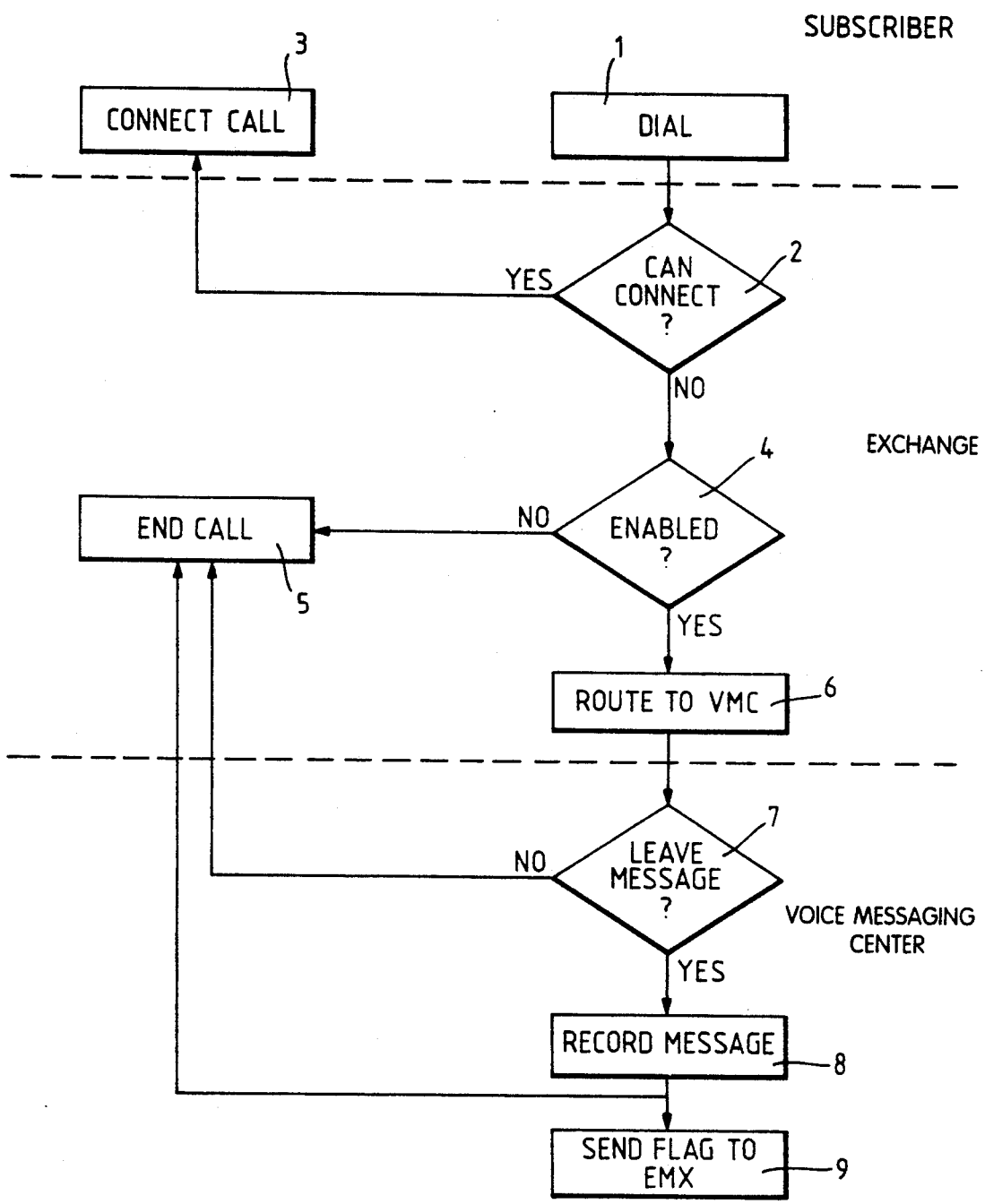

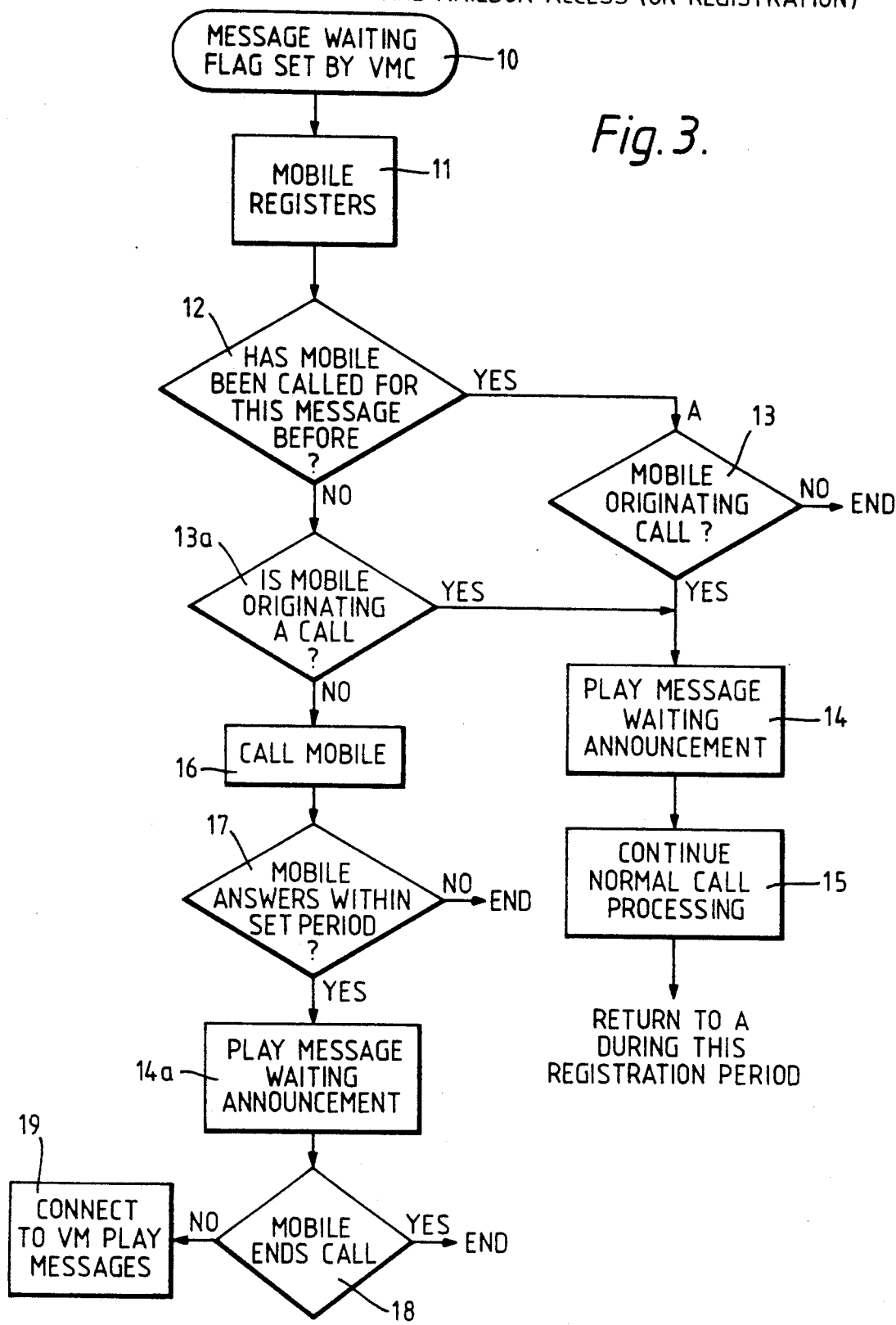

CALL COMPLETION SYSTEM WITH MESSAGE WRITING INDICATION UPON REGISTRATION OF MOBILE WITH BASESTATION

FIELD OF THE INVENTION

This application relates to a system for connecting two communications terminals; particularly, but not exclusively, for voice communications; especially by cellular radio voice communication.

BACKGROUND OF THE INVENTION

It is, of course, annoying when, for some reason, connection to a desired user telecommunications terminal is not possible. This is particularly so with cellular phones, which are often switched off, unattended or out of range, so that resulting call completion rates for land-to-mobile traffic are low (especially at certain times of day).

Messaging services are well known; in particular, in a voice messaging service such as Voicebank (TM), a spoken message is digitally recorded in the mailbox number of the subscriber for whom it is intended, who can then retrieve by himself dialling that mailbox. However, since not every user has a mailbox, voice messaging is not of itself usually an option if a call to a desired user cannot be established. Moreover, a second, different number must be recalled and dialled by the caller, and there is also no guarantee that the called party will play the message. When a user knows that he will be unavailable, he could divert his calls to his voice mailbox, but he must remember to do so and, of course, he may not be aware that he is unavailable (for example, if he is out of range).

SUMMARY OF THE INVENTION

According to the present invention, there is, in one aspect, provided a communications system for connecting a first user terminal to a desired one of a plurality of second user terminals and operable if the system is unable so to connect the first user terminal to store a message from the first user terminal, characterised in that the system includes means for detecting the availability of the second terminal for communication, and is arranged automatically to transmit a message indication signal to the second user terminal when the second terminal is available in the event that that such a message has been stored.

The invention is most useful when the second user terminals are cellular telephones.

In another aspect, there is provided a cellular telephone network comprising an exchange and a voice messaging center connected to the exchange, the exchange being connectable to a plurality of cellular telephones, the exchange being operable in the event of a failure to connect a caller to a desired said telephone, to divert the call to the voice messaging centre, and the voice messaging centre being operable to record the call, characterised in that the voice messaging centre is operable, when such a message has been stored for a said telephone, to transmit a "message waiting" flag for that telephone to the exchange and the exchange is operable, when such a flag is received, to call that telephone when it is available and to send a "message waiting" signal.

Other aspects of the invention are as claimed.

BRIEF DESCRIPTION OF THE DRAWINGS

The invention will now be illustrated, by way of example only, with reference to the accompanying drawings in which:

FIG. 2 is a flow diagram of the operation of a system according to a first aspect of invention; and FIG. 3 is a flow diagram of the operation of a system according to a second aspect of the invention.

DETAILED DESCRIPTION OF THE DRAWINGS

Figure 1:
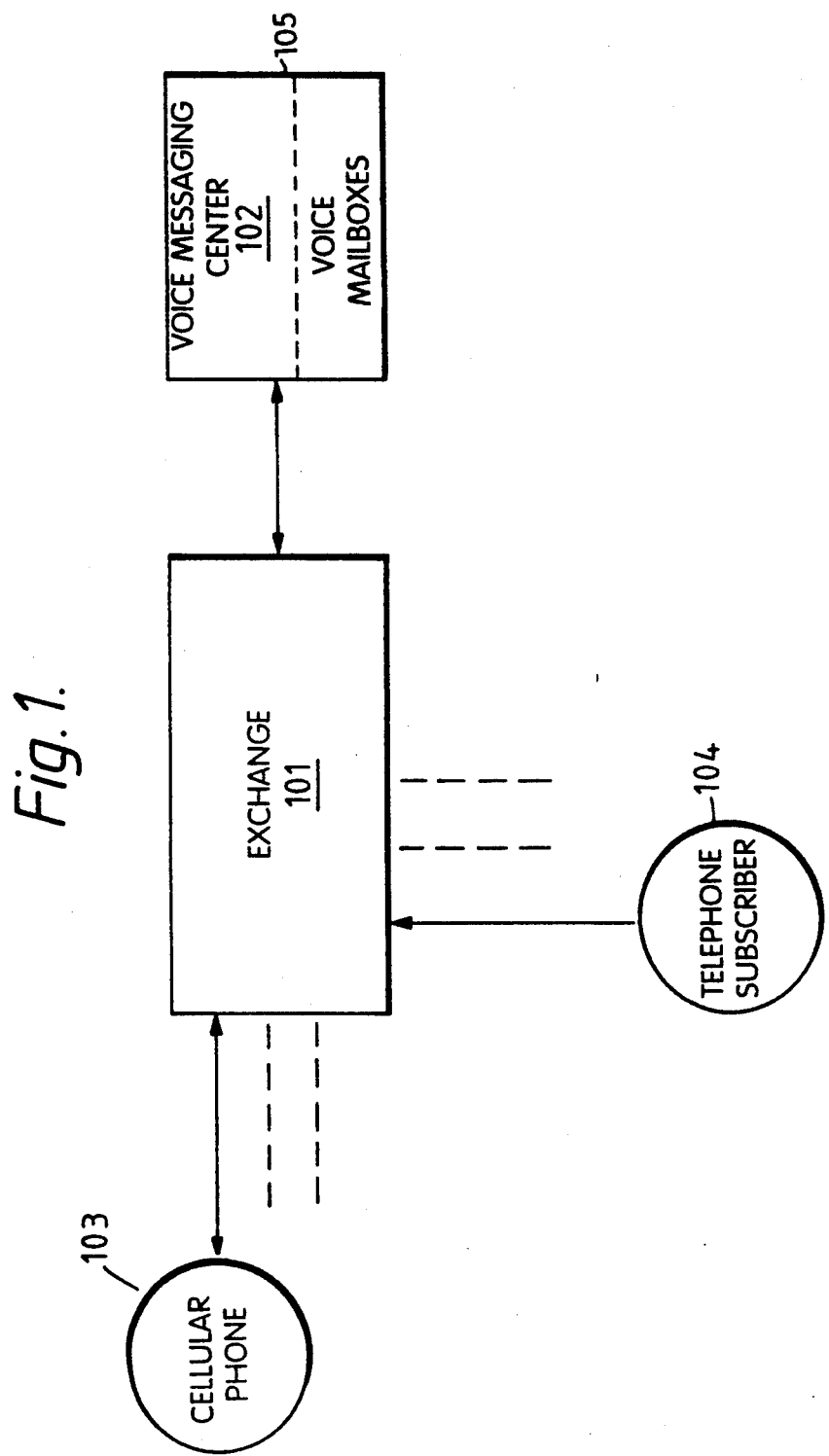
FIG. 1 depicts schematically a system according to the invention.

Referring to FIG. 1, the system comprises at least one exchange (EMX) 101 and at least one (centrally located) Voice Messaging Centre (VMC) 102; whilst these could of course be co-located, it is equally convenient to provide a direct communication link between existing such centres. The exchange (EMX) 101 is connectable to a plurality of subscriber cellular telephones 103 (MOB-1, etc).

Each cellphone 103 on the system would have associated with it a mailbox (VM1) on VMC 102. Mailbox numbers will preferably be identical to the "host" cellphone number.

It will, of course, not be necessary for a user to know his mailbox number; the access to the mailbox is controlled between the exchange (EMX) 101 and the Voice Messaging Centre (VMC) 102.

To minimize customer dialling, the EMX Calling Line Identity (CLI) feature is preferably used by the system for call routing to mailboxes.

Referring to FIG. 2, when a caller (S1) (104, FIG. 1) attempts to call (1) a cellular telephone (MOB-1), he will, if possible (2), be connected (3) as usual. If connection is not possible, the EMX software will check (4) whether, for that telephone (MOB-1), the automatic messaging option is enabled and, if not, terminate the call (5) as in the prior art. If the option is enabled, the exchange (EMX) routes the call (6) to the Voice Messaging Centre (VMC), together with the identify of the mailbox (VM1) corresponding to the cellphone (MOB-1) for which the message is intended. The caller (S1) (104, FIG. 1) can then choose (7) either to leave a message or not; this choice might conveniently be offered by a vocal prompt, and a speaker-independent voice recogniser used to recognise a Yes/No response, or the caller may be allowed to register a 'no' response by terminating the call (hanging up) within, say, 5 seconds of hearing the prompt. If no message is to be recorded, the call is terminated as before (5). If a message is to be left, it is recorded (8) by the Messaging Centre (VMC) in known fashion, and the call is terminated as before (5).

Although the exchange (EMX) transfers a call to the voice messaging centre (VMC), it does not monitor whether a message has been left or retrieved. It is the task of the VMC to monitor the status of each voice mailbox and inform (9) the EMX of any change, by sending a signal to set or cancel a "message waiting" flag at the exchange (EMX). It will be the VMC's responsibility to deal with message housekeeping such as automatic deletion after a given period (e.g. several days or weeks), and to signal any status change to the EMX. The VMC will not set the flag each time there is a new message, only when the status changes from no unread messages to one unread message.

To signal between the EMX and VMC, it would be desirable to use some standard data link such as X-25, but it is acceptable to use a telephony signalling system such as DTMF to transfer a command digit and mobile identity. For the latter, it is proposed that the VMC will dial the EMX over direct trunks and that the EMX will know from the digits sent and the trunk used:

a) the mobile identity;
b) whether to set or cancel the "message waiting" flag for that mobile.

It must be possible for these flag setting and flag resetting signals to be routed through transit EMXs if necessary as there will not (with mobile users) always be direct connection between each EMX with a subscriber file and the corresponding VMC.

If no message waiting indication is available, cellular telephone users of the invention would be required to regularly access their mailbox to see if any messages have been left. Therefore, in another aspect of the invention, the system automatically indicates to the subscriber when such messages are available.

1. Message waiting indication on call origination

In one such embodiment, the indication would be set when the cellphone originates a call if there are unread messages in the mailbox. Message retrieval or messages time-out (e.g. message deletion after 24 hours) cancels the message waiting indication.

2. Message waiting indication on cellphone registration

In a second such embodiment, the message waiting indication would be sent when the cellphone registers. The customer has the option of retrieving messages at this point; the system may allow him to exercise this option by keying, e.g., the SEND key or it may alternatively replay the messages automatically unless he takes some action (e.g. terminates the call).

If a mobile for which a message is waiting registers, then the system will attempt to call the mobile and, if the call is answered, send the indication (preferably, a recorded voiced announcement). These calls from the system to the mobile will not be diverted and the action may be limited to one attempt—i.e. not repeated each time the mobile registers.

If the "message waiting" flag is cleared by the VMS and subsequently set again because a new message has been stored, then the system may try calling the mobile after registration.

Referring to FIG. 3, one such method of system operation for indicating that a message is waiting will be disclosed.

If the 'message waiting' flag is set (10) and a mobile registers (11), the status of a 'mobile called?' flag associated with the (or each) message is tested (12). The flag will be set if the mobile has already been notified of the or each message but has not read it so that the 'message waiting' flag is still set.

If the 'mobile called?' flag is set, the EMX monitors whether the mobile attempts to call out (13) within a predetermined time. If the mobile makes no call attempts, the EMX takes no further action (but leaves the status of the flags unaltered).

If the mobile is attempting to call out, then upon its connection to the EMX, the EMX plays (14) the 'message waiting' recorded announcement, and then continues call processing as usual (15).

When the call is completed, and whilst the mobile is still registered, if it attempts to originate further calls the EMX returns to stage 13 and the same process occurs.

Returning to stage 12, if there is a message waiting the presence of which has not been indicated to the mobile user, the EMX tests (13a) as above whether the mobile is attempting an outgoing call and, if it is, the EMX procedes as above (14, 15) (except that the 'mobile called?' flag is reset after the message).

If it is not, the EMX attempts to place a call to the mobile (16). Should the mobile not answer (17) (due, perhaps, to interference) the EMX takes no further steps (and leaves the status of both flags unchanged). It will be appreciated that at this point other actions, such as a second attempt at calling the mobile, could be undertaken.

If the mobile answers, the EMX plays the 'message waiting' recorded announcement (14a) and resets the 'mobile called?' flag. The EMX then tests whether the mobile wishes to hear the message, by waiting a predetermined time (e.g. 5 seconds) and monitoring whether the mobile user has ended the call (18). If he has done so, no further action is taken. If he has not, it is assumed that he wishes to hear the or each message. The EMX therefore connects him to the VMC (19), specifically to his mailbox and instructs the VMC to replay the or each message.

Although the invention could be implemented on a mandatory basis, it is preferred to provide the invention as a selectable mode of operation of a telecommunication system. Preferably, each user terminal is provided with a way of signalling to the system the mode for that terminal which is desired (i.e. to turn on or off the call storing), and this signalling is conveniently implemented using the '*' key followed by a short code.

The Voice Messaging Centre preferably provides the usual known features offered by voice mail facilities, such as 'message replay', or 'message delete'.

Although the invention has been described as applied to cellular telephones, it is in its broadest sense applicable to other classes of subscriber terminal. It will be understood that, although voice messaging has been described, the invention could equally be applied to store a voiceband data message or even, where a digital network is employed, to store either voice or data messages in the format in which they are transmitted (for example, ASCII characters).

We claim:

1. A communications system for connecting calls from a first user terminal to a desired one of a plurality of second user terminals via a network and operable if the system is unable so as to connect the first user terminal to the desired second user terminal, to store a message from the first user terminal, characterised in that the system includes means for detecting the registration of the second user terminal with the network, where registration is the transition from a state where the second user terminal is unable to make or receive calls to a state where it is able to do so, and means for automatically transmitting a message indication signal to the second user terminal when the second user terminal registers with the network, in the event that such a message has been stored, and wherein the system establishes a call to the second user terminal to deliver said message indication signal, which comprises a recorded voiced message.

2. A cellular telephone system comprising an exchange and a voice messaging centre connected to the exchange, the exchange being connectable to a plurality of cellular telephones via a network, said exchange being operable in the event of a failure to connect a caller to a called telephone, to divert the call to the voice messaging centre, and said voice messaging centre being operable to record a message associated with said call, said system comprises means operable when said message has been stored to set a "message waiting" flag for said called telephone, and means for detecting when said called telephone registers with the cellular telephone network such that said network recognizes said called telephone as being associated with the network, whether a "message waiting" flag has been set, and if said flag for said called telephone is detected, means responsive thereto operable to send a "message waiting" signal to said called telephone, wherein registration is the transition from a state where the second user terminal is unable to make or receive calls to a state where it is able to do so.

3. A cellular telephone network comprising:
   a telephone exchange;
   a voice messaging centre connected to said exchange;
   a plurality of user terminals connected to said exchange;
   said exchange including means for detecting a failure to connect a call from one of said user terminals to another called user terminal and for diverting said call to the voice messaging centre for recording a message associated with said call;
   said voice messaging centre including means responsive to the recording of said message for transmitting a message waiting flag associated with said called user terminal to the exchange;
   said exchange including means for determining when said called user terminal registers with said network for causing said exchange to send a message waiting signal to said called user terminal, wherein registration is the transition from a state where the second user terminal is unable to make or receive calls to a state where it is able to do so, and
   wherein the network establishes a call to the called user terminal to deliver said message waiting signal, which comprises a recorded voiced message.

4. A method of operating a communication system, said system including an exchange, a voice messaging centre connected to the exchange and a plurality of user terminals connected to the exchange, said method comprising:
   detecting in said exchange the failure to connect a call from one of said user terminals to another called user terminal and upon detecting said failure diverting said call to the voice message centre for permitting the recording of a message associated with said call;
   transmitting a message waiting flag associated with said called user terminal from the voice message centre for storage at the exchange if a said message is recorded;
   determining at said exchange when said called user terminal registers with said system, wherein registration is the transition from a state where the second user terminal is unable to make or receive calls to a state where it is able to do so and
   in response to said registration sending a message waiting signal to said called user terminal, and
   wherein the exchange establishes a call to the called user terminal to deliver said message waiting signal, which comprises a recorded voiced message.

5. A communications system for connecting calls from a first user terminal to a desired one of a plurality of second user terminals via a network and operable if the system is usable so as to connect the first user terminal to the desired second user terminal, to store a message from the first user terminal, to store a message from the first user terminal, characterised in that the system includes means for detecting the registration of the second user terminal with the network, where registration is the transition from a state where the second user terminal is unable to make or receive calls to a state where it is able to do so, and means for automatically transmitting a message indication signal to the second user terminal when the second user terminal registers with the network, in the event that such a message has been stored,
   wherein the second user terminals are cellular telephones and the system includes a cellular radio network, and
   wherein the system establishes a call to the second user terminal to deliver said message indication signal, which comprises a recorded voiced message.

6. A method of connecting a call from a first user terminal to a second user terminal via a communication network comprising, connecting the first and second user terminals if the second user is currently registered with the network and is available, and if the second user is currently unregistered or unavailable, storing a message from the first user terminal, and when the second user subsequently registers with the communication network, indicating to the second user terminal that the message is available to be replayed, wherein registration is the transition from a state where the second user terminal is unable to make, maintain or receive a call to a state where it is able to do so.

7. A method as in claim 6 wherein subsequent to indicating that a message is available, stored messages are automatically replayed to said second user terminal after a predetermined time has elapsed.

8. A communications systems for connecting a first user terminal to a desired one of a plurality of second user terminals via a network and operable if the system is unable so as to connect the first user terminals to the desired second user terminal, to store a message from the first user terminal, said system including means for detecting the registration of the second user terminal with the network, wherein the network in response to said means for detecting recognizes said second user terminal as being currently associated with the network and wherein registration is the transition from a state where the second user terminal is unable to make or receive calls to a state where it is able to do so, and means for automatically transmitting a message indication signal to the second user terminal when the second user terminal registers with the network, in the event that such a message has been stored,
   wherein each said second user terminal includes means operable to select a system mode associated with that terminal, the selection being between: a first system mode in which the system is operable automatically to record a said message in the event of a said failure to connect to that terminal; and a second system mode in which the system is not operable to record any such message in any event, and
   wherein individual second user terminals are each associated with the first system mode unless or until the second system mode is selected for an individual terminal by the user.

9. A system according to claim 8, wherein the second user terminals are cellular telephones and the system includes a cellular radio network.

10. A communications system for connecting a first user terminal to a desired one of a plurality of second user terminals via a network and operable if the system is unable so as to connect the first user terminal to the desired second user terminal, to store a message from the first user terminal, said system including means for detecting the registration of the second user terminal with the network, and means for automatically transmitting a message indication signal to the second user terminal when the second user terminal registers with the network, in the event that such a message has been stored, and wherein the system includes means for establishing a call to the second user terminal to deliver said message indication signal, which comprises a recorded voiced message.

11. A system according to claim 10, wherein the second user terminals are cellular telephones and the system includes a cellular radio network.

12. A cellular telephone network comprising:

said exchange including means for detecting a failure to connect a call from one of said user terminals to another called user terminal and for diverting said call to the voice messaging centre for recording a message associated with said call;

said voice messaging centre including means responsive to the recording of said message for transmitting a message waiting flag associated with said called user terminal to the exchange;

said exchange including means for determining when said called user terminal registers with said network for causing said exchange to send a message waiting signal to said called user terminal, wherein registration is the transition from a state where the second user terminal is unable to make or receive calls to a state where it is able to do so, and wherein the network establishes a call to the called user terminal to deliver said message waiting signal, which comprises a recorded voiced message.

13. A cellular telephone network as in claim 12 wherein said exchange includes means responsive to attempts by the called user terminal to initiate communication and the exchange further includes means responsive to said attempts for transmitting a message waiting signal upon such an attempt.

14. A cellular telephone network as in claim 12 in which said called user terminal is operable to select a network mode associated with that terminal, the selecting being between: a first network mode in which the network is operable to automatically record a said message in the event of a said failure to connect to that terminal; and a second network mode in which the network is not operable to record any such message in any such event.

15. A cellular telephone network according to claim 14 which allocates to each user terminal an associated voice messaging mailbox in which said message is recorded, and the called user terminal is operable to select the first mode by transmitting a signal to the network, in which the signal does not identify the associated mailbox.

16. A cellular telephone network according to claim 14, in which said user terminals are each associated with the first network mode unless or until the second network mode is selected for an individual terminal by the user.

17. A method of operating a communication system, said system including an exchange, a voice messaging centre connected to the exchange and a plurality of user terminals connected to the exchange, said method comprising:

detecting in said exchange the failure to connect a call from one of said user terminals to another called user terminal and upon detecting said failure diverting said call to the voice message centre for permitting the recording of a message associated with said call;

transmitting a message waiting flag associated with said called user terminal from the voice message centre for storage at the exchange if a said message is recorded;

determining at said exchange when said called user terminal registers with said system wherein the system in response to said determining recognizes said called user terminal as being operatively associated with the system, and wherein registration is the transition from a state where the second user terminal is unable to make or receive calls to a state where it is able to do so and in response to said registration sending a message waiting signal to said called user terminal.

18. A method as in claim 17 wherein said exchange is further responsive to attempts by said called user terminal to initiate communication on said system to transmit a message waiting signal to said called user terminal.

19. A method as in claim 17 wherein said user terminals include cellular telephones.

20. A method as in claim 17 wherein each said user terminals is operable to select a system mode associated with that terminal, said mode comprising a first mode in which the system is operable to automatically record a said message when said failure to connect is detected at that terminal, or a second mode in which the system is rendered inoperable to record any such message for that terminal.

21. A method as in claim 20 in which the system allocates to each user terminal an associated voice messaging mailbox in which said message is recorded, and the called user terminal is operable to select said first mode by transmitting a signal to the system, in which the signal does not identify the associated mailbox.

22. A method as in claim 20 in which each said user terminal is associated with said first mode unless or until the second mode is selected for an individual terminal by a user.

23. A communications system for connecting calls from a first user terminal to a desired one of a plurality of second user terminals via a network and operable if the system is unable so as to connect the first user terminal to the desired second user terminal, to store a message from the first user terminal, characterised in that the system includes means for detecting the registration of the second user terminal with the network, wherein the network in response to said means for detecting recognizes said second user terminal as being currently associated with the network and wherein registration is the transition from a state where the second user terminal is unable to make or receive calls to a state where it is able to do so, and means for automatically transmitting a message indication signal to the second user terminal when the second user terminal registers with the network, in the event that such a message has been stored.

24. A system according to claim 23, wherein the second user terminals are cellular telephones and the system includes a cellular radio network.

25. A system according to claim 23 or 24, wherein the detection means is responsive to attempts by the second user terminal to initiate communication and the system includes means responsive to said attempts for transmitting a message indication signal upon such an attempt.

26. A system according to claim 23 or 24, in which each said second user terminal is operable to select a system mode associated with that terminal, the selection being between: a first system mode in which the system is operable automatically to record a said message in the event of a said failure to connect to that terminal; and a second system mode in which the system is not operable to record any such message in any such event.

27. A system according to claim 26 which allocates each second user terminal an associated voice messaging mailbox in which said message is recorded, and the second user terminal is operable to select the first mode by transmitting a signal to the system, in which the signal does not identify the associated mailbox.

28. A system according to claim 26, in which individual second user terminals are each associated with the first system mode unless or until the second system mode is selected for an individual terminal by the user.

29. A cellular telephone network comprising an exchange and a voice messaging centre connected to the exchange, the exchange being connectable to a plurality of cellular telephones, said exchange being operable in the event of a failure to connect a caller to a called telephone, to divert the call to the voice messaging centre, and said voice messaging centre being operable to record a message associated with said call, said network comprising means within said voice messaging centre operable, when said message has been stored for said called telephone, to transmit a "message waiting" flag for that telephone to the exchange and said exchange including means operable, when such a flag is received, for calling that telephone when it registers with the cellular telephone network and for sending a "message waiting" signal.

30. A network as claimed in claim 29 wherein each said telephone is allocated an associated voice mailbox at said voice messaging centre by the network.

31. A network according to claim 29 or 30, in which said means for calling and for sending is operable to transmit said "message waiting" signal upon the said called telephone initiating an outgoing call.

32. A network according to claim 29 or 30, in which the "message waiting" signal is a recorded voiced announcement.

* * * * *

UNITED STATES PATENT AND TRADEMARK OFFICE
CERTIFICATE OF CORRECTION

PATENT NO. : 5,313,515
DATED : May 17, 1994
INVENTOR(S) : Michael Allen et al

It is certified that error appears in the above-indentified patent and that said Letters Patent is hereby corrected as shown below:

Column 7, between lines 25 and 26 (claim 12, between lines 1 and 2), the following should be inserted:

-- a telephone exchange;

a voice messaging centre connected to said exchange;

a plurality of user terminals connected to said exchange; --.

Signed and Sealed this

First Day of November, 1994

BRUCE LEHMAN

*Attest:*

*Attesting Officer*　　　　*Commissioner of Patents and Trademarks*